Jan. 22, 1924.
J. B. BURDETT
WELDING TORCH
Filed Feb. 4, 1922
1,481,535
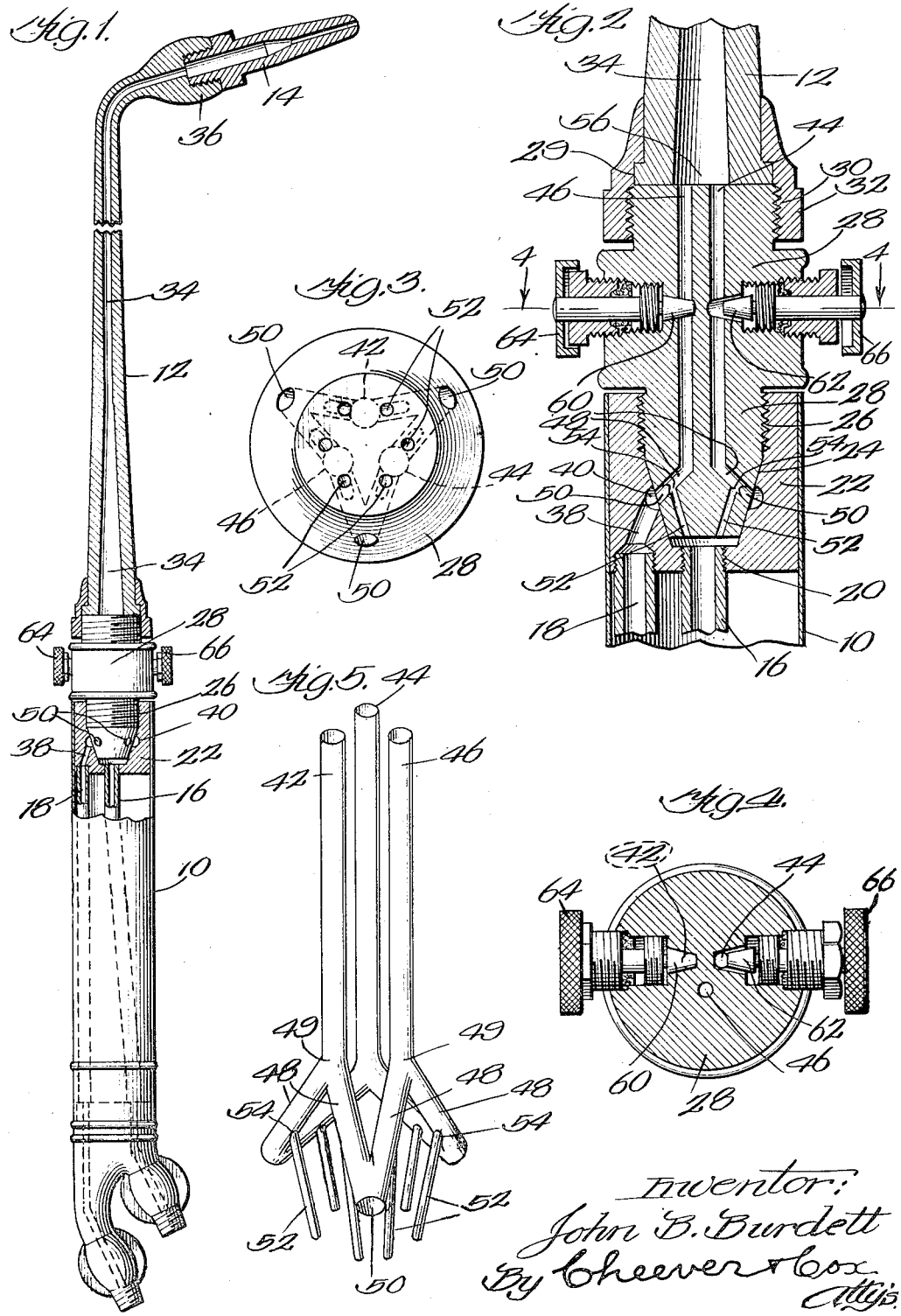

Patented Jan. 22, 1924.

1,481,535

UNITED STATES PATENT OFFICE.

JOHN B. BURDETT, OF GLENCOE, ILLINOIS.

WELDING TORCH.

Application filed February 4, 1922. Serial No. 534,266.

*To all whom it may concern:*

Be it known that I, JOHN B. BURDETT, a citizen of the United States, residing at Glencoe, in the county of Cook and State of Illinois, have invented a certain new and useful Improvement in Welding Torches, of which the following is a specification.

This invention relates to welding torches of the type specially adaptable for mixing acetylene and oxygen, or hydrogen and oxygen gases so that they may be burned at the nozzle of the torch to produce an intensely hot flame for use in welding and the like.

It is well understood in this art that different sized nozzles or tips are required for producing the different sized flames required in the various classes of work in which the device is used. One practice has been to provide a mixing device in each tip, but this is unsatisfactory because of the high cost of the tips of this class. Another practice has been to provide a mixing device intermediate of the ends of the torch proper, usually about the middle, adapted to deliver mixed gas to a passage leading through the torch to the tip, but the difficulty has been to secure proper delivery of gas to the different selected tips placed on the end of the torch, and it has been necessary to separate the torch parts and insert a selected mixing device in the middle of the torch every time a tip or one of a small group of tips is changed. This obviously called for large expense in providing the necessary variety of intermediate mixing devices and wastes time in operation.

The main object of this invention is to provide intermediate of the ends of the torch, usually somewhere near the middle, one single gas mixing device, which is selectively adjustable from outside the torch to control the flow of mixed gas through the torch to the particular tip at the end of the torch.

The invention consists in means attaining the foregoing objects, and more particularly in a special gas mixing and gas control device which can be readily detachably applied and removed at the center of the torch. The invention further consists in numerous features and details of construction which will be hereafter more fully set forth in the specification and claims.

Referring to the drawings, in which like numerals designate the same parts throughout the several views—

Figure 1 is a longitudinal side view, largely in section, of a conventional form of welding torch, having the mechanism of this invention applied thereto;

Figure 2 is an enlarged sectional view of the central or gas mixing portion of the device of Figure 1;

Figure 3 is an end view on approximately the line 3—3 of Figure 2 of the gas mixing member removed from the rest of the device;

Figure 4 is a sectional plan view on the line 4—4 of Figure 2; and

Figure 5 is a perspective view of the tubes of the mixing device as they would look were they made of thin metal removable from the body of the mixing member, instead of being, as they are, made by boring holes in the mixing member.

The mechanism of this invention, largely carried by the member 28, is shown applied to a conventional form of torch of the class described, having a tubular handle 10, a delivery tube 12 and a detachable tip 14.

The handle 10 is provided with interior pipes or passages 16 and 18 of conventional form, each adapted to have connected to it at the rear end of the torch, the lower end, as shown in Figure 1, suitable supply pipes not shown in the drawing, leading away to sources of the respective gases to be mixed.

The upper end of pipe 16, usually but not necessarily carrying the acetylene or hydrogen gas, is detachably fastened, in the particular case here illustrated screw threaded at 20, into the center of a block 22, constituting the upper end of the handle 10. This block 22 is perforated axially of the handle 10 in the truncated conical form 24, the lower end of the perforation being in communication with pipe 16. The upper enlarged end of perforation 24 is cylindrical and provided with screw threads 26 adapted to receive the lower contracted end portion of gas control mixing block 28, whose opposite end is again contracted and provided with screw threads 30 engaged by a detachable wrench engageable nut 32 clamping the delivery tube 12 against the end of block 28. The lower end of delivery tube 12 is journaled at 29 in this nut so that the delivery tube and consequently the tip 14 can be turned to any desired angle without turning the handle 10 and consequently twisting and straining the supply pipes (not shown) leading to it. Tube 12 is provided with a single central perforation 34 leading from the block 28 into the conventional form of tip 14 detachably securable at the end of this delivery tube in conventional manner, as for instance by the screw threads 36. This perforation 34 is made larger at the end next to the block 28 than at the tip end to take care of the expansion of gases which takes place as they emerge from the block 28.

Pipe 18 entering block 22 eccentrically thereof communicates with a diagonal passage 38 entering an annular passage 40 formed in the conical surface of the perforation 24 in block 22.

Member 28 is provided with three longitudinally extending suitable sized passages 42, 44 and 46, all of whose upper ends open into the passage 34 in the delivery tube 12, and whose lower ends terminate in the annular passage 40 heretofore referred to. In the particular case here illustrated, the lower ends of the passages 42, 44 and 46 are divided or branched before reaching annular passage 40 in the angularly disposed branch members 48, discharging into the annular passage 40 in the ports 50 shown clearly in Figure 3. The passages 42, 44 and 46 may be varied in size as desired. No limitation is intended by showing them all the same size.

Gas, usually oxygen, passing upward through pipe 18 passes circumferentially of plug 28 through passage 40, and thence enters each of the ports 50 leading to the three different passages 42, 44 and 46.

The branch pipes 48 leave the wall of conical opening 24 at approximately right angles thereto and are in communication with pipe 16 through smaller passages 52 leaving these branch pipes 48 at approximately right angles thereto and communicating with the end of pipe 16. Gas delivered into block 28 by pipes 16 and 18 is first thoroughly mixed at the three independent juncture points 54 between the passages 52 and passages 48, and the mixed gases passing through the pipes 48 which lead into a specific one of the pipes 42, 44, or 46, are again mixed at the juncture point 49 with that particular pipe, this all as shown, described and claimed in Patent #1,432,528 issued October 17, 1922. Finally assuming passages 42, 44 and 46 to be open, the gas flowing through them is finally thoroughly mixed at the upper end of block 28 or about point 56, as these various quantities of gas enter the passage 34 of delivery tube 12, thereby insuring, in the operation of the device, as thus far described, a very thorough mixing of the two kinds of gas supplied by pipes 16 and 18 before the mixture is delivered to tip 14.

In order to regulate the flow of gas from the pipes 16 and 18 through the mixing passages described, and thence to the nozzle, some of the passages 42, 44 and 46, as for instance 42 and 44, are provided intermediate of their ends with valves 60 and 62 selectively operatable from outside the device, as for instance by manipulating the thumb nuts 64 and 66, whereby in conventional manner either passage can be independently closed off, as shown, in connection with passage 42, Figures 2 and 4, or left open, as shown, in connection with passage 44 in the same figures.

When the operator manipulates these valves to completely close the two valved passages, only a limited quantity of mixed gas will flow through passage 46 from the pipes 16 and 18 to the tip 14. Under these conditions, the operator may use several of the smaller sizes of standard tips 14 and secure satisfactory results. When larger or intermediate sized tips are to be used on the end of the torch, the operator opens one of the valves 60 or 62 but not both, thereby allowing mixed gas to flow through passage 46 and a selected one of passages 42 or 44, and finally, when the largest size commercial tips are to be used on the torch, the operator manipulates the valves so that three of the passages 42, 44 and 46 are opened. Intermediate graduations may be obtained by leaving one or both valves 60 or 62 partly open, as the conditions of the work may require.

In the complete operation of the device, the gases which are to be mixed are supplied to the lower end of the torch, as viewed in Figure 1, through pipes 16 and 18, and the operator manipulates the valves 60 and 62 to control the amount of mixed gas passing through the block 28 to the passage 34, and thence to the tip 14, and by opening and closing different combinations of the valves, secures a proper flow of gas so that approximately fifteen of the standard nozzles known in this art may be used on this torch without its being necessary to take the torch apart and put in a new mixing device in place of the block 28 and attached parts, as has been heretofore required in this art. In addition thereto, each passage 42—44—46 is provided with its own described mixing device so that whether only one or all of these passages are open the gas delivered to passage 34 and thence to nozzle 14 is thoroughly mixed.

Actual practice with the torch shown and described demonstrates that the gas mixing produced by the mixing device shown and described in connection with block 28 is so thorough that very much more satisfactory results are obtained when the entire range of tips is used and valves 60 and 62 are never closed than has ever been known in the art.

What I claim is:

1. In a mechanism of the class described, a handle having two independent gas passages leading therethrough, a single gas passage, tip-carrying, delivery tube leading away from the handle, an independent separable gas control block interposed between the handle and the delivery tube, having a plurality of separated gas passages therethrough each communicating at one end with the delivery tube and at the other end with both of the passages in the handle, and selectively manipulatable means for closing one of said passages in the gas control block for the purposes set forth.

2. In a mechanism of the class described, a handle having two independent gas passages leading therethrough, a single gas passage, tip-carrying, delivery tube leading away from the handle, an independent separable gas control block interposed between the handle and the delivery tube, having a plurality of separated gas passages therethrough each communicating at one end with the delivery tube and at the other end with both of the passages in the handle, independent means in the path of travel of the gas which passes through each of said passages through the control block for mixing, a plurality of times, the gases delivered through the tubes in the handle, and selectively manipulatable means for closing one of said passages in the gas control block for the purposes set forth.

3. In a mechanism of the class described, a handle having two independent gas passages leading therethrough, a single gas passage, tip-carrying, delivery tube leading away from the handle, a gas control block interposed betwen the handle and the delivery tube, having a plurality of separated gas passages therethrough each communicating at one end with the delivery tube and at the other end with both of the passages in the handle, means at the handle end of each of said passages through the control block for mixing, a plurality of times, the gases delivered through the tubes in the handle, and selectively manipulatable means for closing one of said passages in the gas control block for the purposes set forth.

4. In a mechanism of the class described, a handle having two independent gas passages leading therethrough, a single gas passage, tip-carrying, delivery tube leading away from the handle, a gas control block interposed between the handle and the delivery tube, having a plurality of separated gas passages therethrough each communicating at one end with the delivery tube and at the other end with both of the passages in the handle, and selectively manipulatable means operating from the side of the control block for closing one of said passages in the gas control block for the purposes set forth.

5. In a mechanism of the class described, a handle having two independent gas passages leading therethrough, a single gas passage, tip-carrying, delivery tube leading away from the handle, a gas control block interposed between the handle and the delivery tube, having a plurality of separated gas passages therethrough each communicating at one end with the delivery tube and at the other end with both of the passages in the handle, means in conjunction with each of said passages through the control block for mixing, a plurality of times, the gases delivered through the tubes in the handle, and selectively manipulatable means operating from the side of the control block for closing one of said passages in the gas control block for the purposes set forth.

6. In a mechanism of the class described, a handle having two independent gas passages leading therethrough, a single gas passage, tip-carrying, delivery tube leading away from the handle, a gas control block interposed between the handle and the delivery tube, having a plurality of separated gas passages therethrough each communicating at one end with the delivery tube and at the other end with both of the passages in the handle, means at the handle end of each of said passages through the control block for mixing, a plurality of times, the gases delivered through the tubes in the handle, and selectively manipulatable means operating from the side of the control block for closing one of said passages in the gas control block for the purposes set forth.

7. In a mechanism of the class described, a handle having two independent gas passages leading therethrough, a single gas passage, tip-carrying, delivery tube leading away from the handle, a separable gas control block interposed between the handle and the delivery tube, having a plurality of separated gas passages therethrough each communicating at one end with the delivery tube and at the other end with both of the passages in the handle, and means in conjunction with each of said passages through the control block for mixing, a plurality of times, the gases delivered through the tubes in the handle.

8. In a mechanism of the class described, a handle having two independent gas passages leading therethrough, a single gas passage, tip-carrying, delivery tube leading away from the handle, a separable gas control block interposed between the handle and the delivery tube, having a plurality of separated gas passages therethrough each communicating at one end with the delivery tube and at the other end with both of the passages in the handle, and means at the handle end of each of said passages through the control block for mixing, a plurality of times, the gases delivered through the tubes in the handle.

9. In a mechanism of the class described, a handle having two independent gas passages leading therethrough, a single gas passage, tip-carrying, delivery tube leading away from the handle, a gas control block interposed between the handle and the delivery tube, having at least three independent gas passages therethrough each communicating at one end with the delivery tube and at the other end with both of the passages in the handle, and means in each of said passages through the control block for mixing, a plurality of times, the gases delivered through the tubes in the handle.

10. In a mechanism of the class described, a handle having two independent gas passages leading therethrough, a single gas passage, tip-carrying, delivery tube leading away from the handle, a gas control block interposed between the handle and the delivery tube, having at least three independent gas passages therethrough each communicating at one end with the delivery tube and at the other end with both of the passages in the handle, and means at the handle end of each of said passages through the control block for mixing, a plurality of times, the gases delivered through the tubes in the handle.

11. In a mechanism of the class described, a handle having two independent gas passages leading therethrough, a single gas passage, tip-carrying, delivery tube leading away from the handle, a gas control block interposed between the handle and the delivery tube, having a plurality of independent gas passages therethrough each communicating at one end with the delivery tube and at the other end with both of the passages in the handle, and means in conjunction with each of said passages through the control block for mixing, at least three times, the gases delivered from the tubes in the handle to the torch tip.

12. In a mechanism of the class described, a handle having two independent gas passages leading therethrough, a single gas passage, tip-carrying, delivery tube leading away from the handle, a gas control block interposed betwen the handle and the delivery tube, having a plurality of independent gas passages therethrough each communicating at one end with the delivery tube and at the other end with both of the passages in the handle, and means at the handle end of each of said passages through the control block for mixing, at least three times, the gases delivered from the tubes in the handle to the torch tip.

13. In a mechanism of the class described, a handle having two independent gas passages leading therethrough, a single gas passage, tip-carrying, delivery tube leading away from the handle, a separable gas control block interposed between the handle and the delivery tube, having at least three independent gas passages therethrough each communicating at one end with the delivery tube and at the other end with both of the pasages in the handle, and means in conjunction with each of said passages through the control block for mixing, at least three times, the gases delivered from the tubes in the handle to the torch tip.

14. In a mechanism of the class described, a handle having two independent gas passages leading therethrough, a single gas passage, tip-carrying, delivery tube leading away from the handle, a separable gas control block interposed between the handle and the delivery tube, having at least three independent gas passages therethrough each communicating at one end with the delivery tube and at the other end with both of the passages in the handle, and means at the handle end of each of said passages through the control block for mixing, at least three times, the gases delivered from the tubes in the handle to the torch tip.

In witness whereof, I have hereunto subscribed my name.

JOHN B. BURDETT.